June 16, 1953　　　P. M. MITCHELL　　　2,642,303
AUTOMOBILE BUMPER GUARD
Filed Aug. 4, 1947
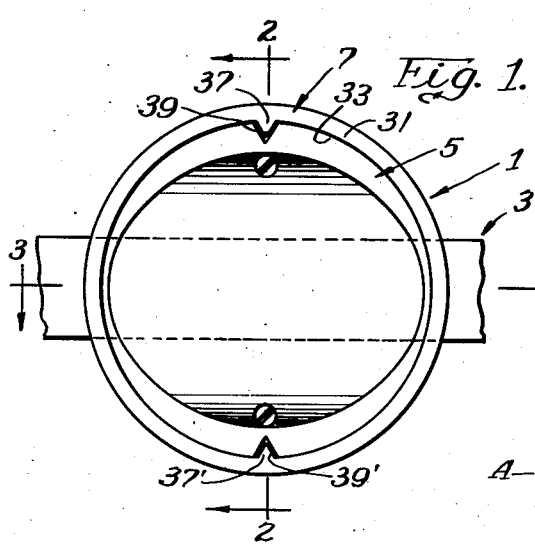
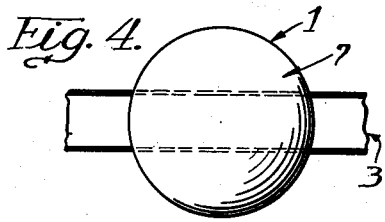
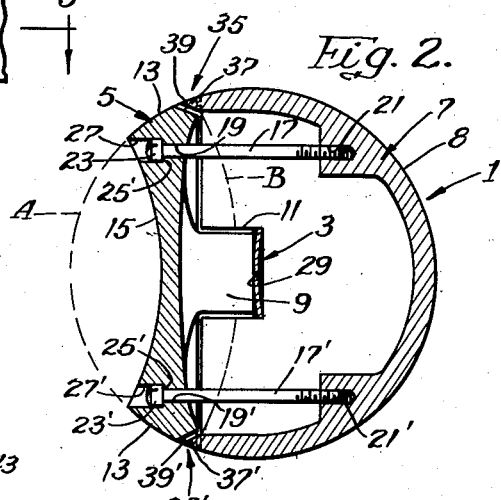
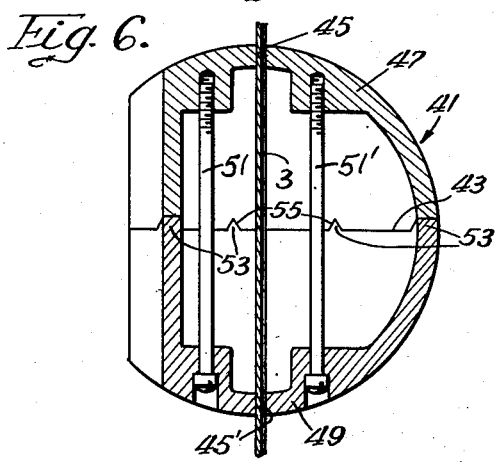
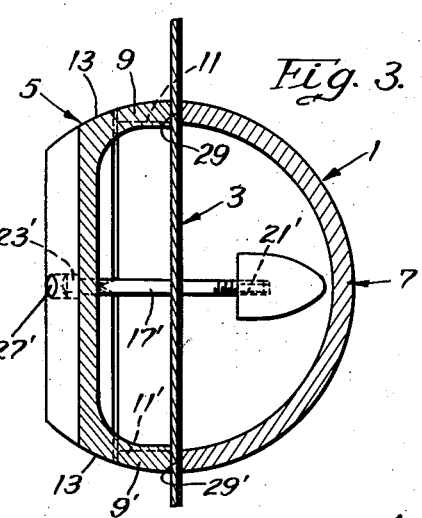
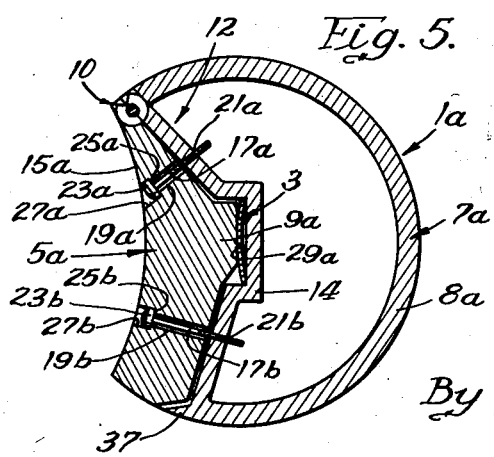
Inventor:
Paul M. Mitchell
By　*Brown Jackson Boettcher Dienner*
　　Att'ys.

Patented June 16, 1953

2,642,303

UNITED STATES PATENT OFFICE 2,642,303

AUTOMOBILE BUMPER GUARD

Paul M. Mitchell, Chicago, Ill., assignor of one-half to Alice M. Mitchell, Chicago, Ill.

Application August 4, 1947, Serial No. 766,015

14 Claims. (Cl. 293—65)

My invention relates generally to bumper guards and particularly to guards for vehicle bumpers. Although the bumper guard of my invention is adapted to be used in conjunction with a variety of types of bumpers secured either to fixed or movable objects, it is especially useful when employed with an automobile bumper and I shall therefore describe it in that connection.

Early in the manufacture of automobiles it became standard practice to apply a bumper element, usually connected with the frame, at the forward end and at the rear end of the automobile in order to provide protection against damage to the frame and body by reason of a collision with some object. Since the various manufacturers of automobiles have never standardized upon the height of their bumpers from the road, it has been a common experience when two automobiles collide with each other, even though gently, to have the bumper of one automobile slide up over the top of a bumper of another automobile, or to slide under said other bumper, with resulting damage to the bodies of both automobiles and occasionally to the cooling systems, engines, luggage compartments, headlights, and other parts of the automobiles. When the bumpers pass over each other in the manner described above, it is not uncommon for them to hook upon the back sides of each other or an adjacent part of the frame or body thus rendering them impossible to separate until the upper bumper has been lifted sufficiently, or the lower one pushed down, so that they may be unhooked and then moved away from each other. When the bumpers do become so hooked together, tools for raising or lowering the adjacent ends of the automobiles and bumpers are seldom conveniently available so drivers or passers-by are compelled to attempt manually to extricate the two vehicles. Such attempts commonly result in muscular strains and in some instances in damage to or severance of the fingers or other injuries to the hands of the individual.

Even with the bumpers of different automobiles being positioned at substantially the same height above the road that does not prevent the interlocking or hooking of the bumpers by one passing beneath or over the bumper of another automobile, since, during the application of the brakes of an automobile, when it is moving forwardly, the front end of the automobile is lowered and the rear end is raised if the vehicle is being stopped quickly. An automobile which follows upon the path of another which has come to a rapid halt will, by the forceful application of its own brakes, also cause a lowering of its front end with the result that the second car in line may easily run its bumper beneath the raised bumper of the car preceding it.

Although automobiles generally are not driven backwardly one after another in close relationship, the same interlocking may result if an automobile is being backed quickly into a parking space and the brakes are applied suddenly, since the rear end of the automobile may then be lowered sufficiently to have its rear bumper pass beneath the bumper of an automobile parked behind it. During such parking operations the adjacent bumpers are seldom parallel to each other and if one overrides another they usually cross at an angle.

In an attempt to prevent the passage of a bumper of one automobile past the bumper of another vehicle, automobile manufacturers or suppliers of parts have made available various shapes of bumper guards in the form of spurs or posts which are secured to the bumper and extend vertically above and below it. In many instances the spurs or posts which are connected with the bumper serve to prevent the passage of one bumper past another. However, at such time as the bumper of one vehicle rides over the bumper on another vehicle and also the spur or post carried by said bumper, the interlocking of the two bumpers and their spurs becomes even more complete. It then becomes necessary to raise the automobile, whose bumper has ridden over the bumper of another, to even a greater height than before to disengage the two bumpers and their spurs (or to lower the bumper which is lowermost a greater degree) before the two cars can become unlocked from each other.

It often becomes necessary to use one vehicle to push another when, for example, the battery of one becomes so discharged as to be unable to supply sufficient current to its starter motor to cause said motor to operate. Such pushing is not without difficulties even when the bumpers are the same height above the ground, and it is still more difficult when the bumpers are of different height. This is true even though the bumpers have guards attached thereto, as the pressure caused by pushing tends to raise—or lower, depending upon the point of contact—the contacted bumper of the vehicle being pushed.

It is one object of my invention to provide a guard element for a bumper, which guard element serves to prevent the passage of the bumper of another vehicle over or under its own bumper.

It is another object of my invention to provide a bumper guard for a vehicle which will cause its bumper and the opposing bumper of another vehicle to assume the same height above the ground in the process of pushing one vehicle by the other.

It is still another object of my invention to provide a bumper guard which serves readily to permit the release of a bumper which has ridden over or under it without the necessity of mechanically or manually lifting the uppermost bumper or pressing down on the lowermost bumper.

In the accomplishment of the first two objects I provide a bumper guard which has an inwardly curved or concave surface which has its axis of curvature substantially parallel to the longitudinal axis of the bumper. Since the outer surfaces of bumpers are generally convex, the concave or inwardly directed surface of my bumper guard is adapted to center the bumper of an adjacent vehicle with respect to the bumper of the vehicle on which my form of bumper guard is installed. Even though the bumper of the adjacent vehicle may be higher or lower than the bumper carrying my guard, the guard thereby tends to bring them to the same level so that it is possible for the two vehicles to collide bumper to bumper, and obtain the benefit of the resiliency of the bumpers without danger of the bumpers riding over or under each other. This centering action is particularly advantageous when the driver of one automobile wishes to push another automobile over a road which is uneven.

In accomplishing the third object of my invention—namely, to provide a bumper guard which, if passed over or under by the bumper of another car, will permit the ready release of the other bumper from the bumper on which my guard is carried and from said guard itself—I provide a spherical surface over which the interlocked bumper of an adjacent car may readily pass to a free position without catching or hooking on the guard or on the bumper. Since the greatest part of the surface of the guard is spherical or similarly curved it is possible to release a bumper of one car, which has passed over the bumper carrying my guard, even when the bumpers have passed over each other at an angle since the curvature of the guard is the same, or substantially so, at all points over which the bumper to be released will ride. The curved surface acts as a cam for smoothly and easily raising, or lowering, the bumper, which has passed over or under the guard of my invention and the bumper carrying it, and thereby permits release of the bumpers, one past the other. Although one or more of the bumper guards may be employed on each bumper I prefer the employment of three of them spaced apart from each other along the bumper, preferably with a larger guard in the center and a smaller one near each end.

It is a further object of my invention to provide a bumper guard having the foregoing characteristics which also is adaptable for use with bumpers of varying sizes without requiring a change in, or replacement of, the parts of the bumper or guard. It is a further object in this connection that the guard be so formed that it may easily be attached to the bumper by the owner of the car with ordinary tools, the assistance of a skilled mechanic being unnecessary.

It is a further object of my invention to provide a spherical bumper guard which has a thickened front portion, since the front portion will receive the strongest blows, and a hollow rear portion which serves primarily as a cam surface which receives less impact and stress. This not only results in a guard which is less expensive to produce but also one which is less expensive to ship and is easier to handle. The bumper guard may be manufactured by any suitable forming operation.

Further objects, uses and advantages of my invention will become apparent from the following description when taken with the drawing in which:

Figure 1 is a front elevational view of a bumper guard embodying my invention secured to a bumper which is shown fragmentarily;

Figure 2 is a sectional view on the line 2—2 of Figure 1;

Figure 3 is a sectional view on the line 3—3 of Figure 1;

Figure 4 is a rear elevational view, on reduced scale, of the bumper guard of Figure 1;

Figure 5 is a central, vertical section of a modified form of bumper guard embodying my invention; and Figure 6 is a central, horizontal section of yet another modified form of bumper guard incorporating my invention. Like reference numerals have been employed in the several views to indicate the same or similar elements where practicable.

Referring now to Figures 1 through 4 there will be seen a bumper guard embodying my invention, which guard is indicated generally by the reference numeral 1 and is secured to a bumper which is shown fragmentarily and indicated generally by the reference numeral 3. In the preferred form of my invention I construct the bumper guard in two parts consisting of a front portion, indicated generally by the reference numeral 5, and a rear portion, indicated generally by the reference numeral 7. The front portion 5 bears against the front surface of the bumper 3 by means of a pair of projections 9 and 9' which fit within recesses 11 and 11' formed in the wall of the rear portion 7. As may be seen most clearly from Figures 2 and 3, the bumper 3 is adapted to pass through the bumper guard 1 substantially along a diameter of the rear portion 7, which rear portion is substantially spherical in outline. When I refer to "front portion 5" and "rear portion 7" it will be understood that the words "front" and "rear" are relative terms indicating the position of the greatest part of each of said portions with respect to the bumper when the bumper passes through the guard. It will be understood, however, that the bumper guard 1 could be so constructed that the bumper 3 could pass through the guard 1 at other locations and could even be secured to a front or rear surface of the guard.

The projections 9 and 9' are located on opposite sides of the front portion 5 and are adapted to press tightly against the bumper 3 when the means for fastening the front and rear portions together is employed, as will be pointed out more fully hereinafter. In this manner the guard is secured firmly to the bumper against displacement in any direction transversely of the bumper or longitudinally thereof. It will be appreciated that in place of the projections 9 and 9' there may be employed a single projection extending from side to side of the front portion 5, thus making the whole of front portion 5 a substantially complete solid. Such construction is preferred and is similar to that illustrated in Figure 5 which will be described hereinafter.

The rear portion 7 in its preferred form has its outer surface 8 in the form of a sphere and has a greater surface area than the surface area of a hemisphere. Although the rear portion 7 may be formed of a solid piece of metal, or other durable material, I prefer to form it substantially hollow as shown most clearly in Figures 2 and 3. It has sufficient strength in such hollow form and it is much lighter to handle and less expensive to produce when so constructed. However, I prefer to form the front portion 5 as a substantially solid member since it will be that portion of the bumper guard which is subjected to the severest and most direct blows.

As will be noted most clearly from Figures 1, 2 and 3 that the front portion 5 includes a surface 13 which is a continuation of the spherical surface of the rear portion 7. The front surface 15 of front portion 5 is, however, directed inwardly and is adapted to have a shape complementary to the shape of the object, such as another bumper, against which it is most often adapted to abut. It will be noted that surface 15 is curved and that the deepest portion of the curve is positioned substantially centrally of the front portion 5 and has its axis of curvature substantially parallel to, and at the same level above the ground as, the longitudinal axis of the bumper 3. In the illustrated form, surface 15 represents the surface produced in the intersection of a cylinder with a sphere. This construction of the front portion 5 serves to center against the bumper 3 a bumper of another automobile which other bumper is somewhat higher or somewhat lower than the bumper 3 carrying the bumper guard 1 of my invention. By this means my guard 1 serves to prevent the bumper of another automobile from slipping over or under the bumper of the automobile which has the guard of my invention.

If, for example, the object which the bumper guard 1 is most commonly adapted to abut against is concave instead of convex it might, in some instances, be desirable to form the front portion 5 of the bumper guard of my invention with a convex surface as is indicated by the dot-dash line A of Figure 2. If other shaped objects are most often adapted to be engaged by the bumper guard, it will be understood that an appropriate complementary surface could be formed on the front portion 5 of my bumper guard which surface would be best adapted to center such objects with respect to the guard and the bumper carrying it. Not only does this centering operation serve to prevent the object, such as another bumper, from sliding over or under the bumper carrying the guard but it also serves to position the object directly in front of the bumper 3 so that the flexibility thereof may best be employed in absorbing any shock from contact with the object.

It will be observed that the front portion 5 is secured to the rear portion 7 by means of a pair of threaded bolts 17 and 17' which pass through apertures 19 and 19' in the front portion 5 and which are threaded into sockets 21 and 21' in the rear portion 7. The heads 23 and 23' of the bolts 17 and 17', respectively, are adapted to seat against shoulders 25 and 25', respectively, at the inner ends of the enlarged bores or recesses 27 and 27' which are aligned with the apertures 19 and 19'.

The recesses 11 and 11' in the rear portion 7 of my bumper guard 1 may be made sufficiently large vertically, to accommodate the largest of the bumpers which will be encountered in normal use. This will then permit bumpers of lesser height to also fit within the recesses 11 and 11' and be pressed against the respective surfaces 29 of said recesses by the projections 9 and 9' of the front portion 5, or by a solid projection extending from side to side of said front portion, if said solid projection is substituted for projections 9 and 9'. By reason of the manner of interconnection of the front portion 5 and the rear portion 7 by threaded bolts 17 and 17' it will be seen that bumpers of varying thicknesses may be accommodated and pressed between the projection 9 and 9' and the rear walls 29 of the recesses 11 and 11' respectively. Since the heads 23 and 23' of the bolts 17 and 17', respectively, are seated within the bores or recesses 27 and 27' beneath the surface 15 of the front portion 5 they do not obstruct any centering operation which the front portion 5 performs and are not adapted to be sheared off by an object engaged by said front portion. It will be understood that other forms of fastening means may be employed to secure together the front portion 5 to the rear portion 7 and, thereby, hold the bumper guard 1 to the bumper 3.

Although I have described the rear portion 7 as having a spherical surface 8 it will be understood that other curved surfaces may also be employed. However, I prefer to employ a spherical surface and it is desirable that said surface be substantially continuous and uninterrupted over an area greater than that provided by a hemisphere. If the cleavage plane between the front portion 5 and the rear portion 7 is located forwardly of the bumper 3, any object which has passed over or under the bumper guard 1 may be withdrawn therefrom in a forward direction very easily without danger of catching at said cleavage plane. To further reduce any possibility of an object catching or hooking at the cleavage plane I form the front edge 31 of the spherical rear portion 7 in such a fashion that it overlies the adjacent edge 33, that is, the rear edge, of the front portion 5 at least at two places as indicated by the reference numerals 35 and 35'. I may also substitute for the cleavage plane shown, a different line of cleavage such as that shown by the dot-dash line B of Figure 2, which line does not lie in a single plane but instead runs on the bias so as to lessen the possibility of a bumper's being caught in it.

So that the front portion 5 and rear portion 7 will not shift relative to each other when they are secured together by the bolts 17 and 17', the rear portion 7 at its forward edge carries projections 37 and 37' which are adapted to fit in complementary recesses 39 and 39' in the front portion 5. In addition to preventing relative movement longitudinally of the bumper the projections 37 and 37' and recesses 39 and 39' also prevent relative rotation of the front portion 5 with respect to the rear portion 7. Inter-fitting of the two portions in this manner also serves as a means for easily and properly positioning the front and rear portions together so that they may be easily secured together by the bolts 17 and 17'.

It will readily be seen that any object, such as a bumper of another car, for example, which passes over or under the bumper 3 and the guard 1 may be readily withdrawn from behind the bumper and guard since the curved upper or lower surface of the guard 1 will permit the object to ride upwardly and over the top of the guard and off of it and the bumper, or downwardly and under the guard and bumper, to a free and untangled position. It is not at all necessary that the object needs to ride over the bumper 3 and guard 1 into a position behind said bumper and guard parallel to the bumper 3, for even if said other bumper lies at an angle across the bumper 3 and behind the guard 1 said other bumper may readily be withdrawn regardless of the angle since the surface 8 of the rear portion 7 is curved equally at all portions of its surface. In the preferred employment of my invention I provide three bumper guards for a bumper with the guards being spaced apart from each other along the longitudinal axis of the bumper 3, preferably with a larger guard in the center and smaller guards adjacent the ends. Since the cleavage plane between the front portion 5 and the rear portion 7 is located forwardly of the highest part, or the lowest part, of the bumper guard 1, a bumper which is being disentangled and is riding over, or under, said guard is already free of the guard and is sliding downwardly, or upwardly from the surface of the guard before it reaches the cleavage plane and consequently there will be no catching in the slight gap which exists between the front portion 5 and rear portion 7. Even though the bumper 3 which carries the guard 1 may be exceptionally thick and causes a greater than normal separation between said front and rear portions, the bumper which is being disentangled will be carried over the gap by reason of the fact that the rear portion 7 overhangs the front portion 5 as at 35 and 35'. Where a cleavage plane such as that indicated by the dot-dash line B of Figure 2 is employed, the bumper will be riding over the cleavage plane at an angle and will therefore not fall into any gap which may exist between the front and rear portions.

Although I prefer, when making the bumper guard 1 of two pieces, to have the cleavage plane similar to that illustrated in Figures 1 through 3, it is possible to provide a cleavage plane at right angles to that illustrated in Figures 1 through 3 as may be seen from the form of bumper guard 41 illustrated in Figure 6. The cleavage plane is along the line 43 and the bumper 3 is adapted to pass through an aperture 45 in a first portion 47 and through an aperture 45' in a second portion 49 of the bumper guard 41. In positioning the two portions 47 and 49 on the bumper, each is led onto the bumper by having an end of the bumper pass through the apertures 45 and 45'. Bolts such as the bolts 51 and 51' may be used to secure the portions 47 and 49 together in very much the same manner as that shown in Figures 1 through 3. Projections such as the projection 53 on the portion 49 are adapted to interfit with correspondingly shaped recesses 55 formed in the portion 47. The interengagement of the projections and recesses prior to their being secured together by the bolts 51 and 51' aligns the two portions and also prevents relative movement between said portions when they are secured together about the bumper 3. Since most bumpers are slightly bowed, fastening of the two portions 47 and 49 together will tend to have the side edges of the apertures 45 and 45' bear against the edges of the bumper and prevent movement longitudinally thereof by the guard.

Referring now to Figure 5, there will be seen a modified form of bumper guard 1a wherein the front portion 5a and the rear portion 7a are hinged together as at 10 so that the bumper guard 1a may have its portions 5a and 7a swung apart and thereby separated sufficiently to permit the guard to be fitted about the bumper 3. When fitted about the bumper 3, the guard 1a may then have its portions 5a and 7a secured together by bolts 17a and 17b. It will be noted that the rear portion 7a has a curved surface which, in the preferred form, is spherical with the total outer area being substantially greater than the outer area provided by a hemisphere. The front portion 5a has its front face 15a inwardly curved toward the bumper 3 and is adapted to center objects, such as another bumper, with which it may come into engagement. The rear portion 7a has a wall, indicated generally by the reference numeral 12, at the free or forward edge of the rear portion 7a, which wall is inclined backwardly from both the top and bottom of portion 7a toward a recessed portion 14, said recessed portion being adapted to fit about the bumper 3 and have the rear side of said bumper pressed against the wall 29a of the recessed portion 14 by a projection 9a formed on the front portion 5a of the bumper guard 1a. The recessed portion 14 is of such height as to accommodate bumper guards of varying heights and the recessed portion has a depth greater than the thickness of any bumper with which it will be employed. The front portion 5a of the bumper guard 1a is also adapted, by reason of its hinged connection 10 with the rear portion 7a, to allow for bumpers of different thicknesses. Since bumpers of different thicknesses will cause a variation in the angle between the portions 5a and 7a, the apertures 19a and 19b in front portion 5a of the bumper guard 1a are so formed as to have a diameter greater than the diameter of the bolts 17a and 17b which are adapted to pass therethrough. The enlarged diameter of passageways 19a and 19b is provided so that when the bolts 17a and 17b are threaded into apertures 21a and 21b in the wall 12 said bolts need not lie along the longitudinal axes of the apertures 19a and 19b but instead may lie at an angle therewith when the front portion 5a is required by a thick bumper to lie forwardly of its normal position. The bolts 17a and 17b, when drawn up tight, serve to press the bumper 3 against the wall 29a of the recessed portion 14 in wall 12 by the single solid projection 9a of front portion 5a and to prevent the bumper guard 1a from being shifted in any direction with respect to the bumper. It will be seen that the heads 23a and 23b of the bolts 17a and 17b, respectively, are adapted to bear against shoulders 25a and 25b formed at the junction of the passageways 19a and 19b with the larger-diameter bores or recesses 27a and 27b.

It will be observed that the forward free edge 37 at the underside of the rear portion 7a is adapted to overlie the front portion 5a of the bumper guard 1a so that there will be no possibility for an object, such as another bumper, to catch in the gap between the portions 5a and 7a when said other bumper is being pulled from behind the bumper guard 1a and bumper 3. Furthermore, the hinged connection 10 between portions 5a and 7a is positioned at the upper side of the bumper guard 1a forwardly of the highest part of said guard so that any object passing over the upper surface of the rear portion 7a of the bumper guard will already have become free of the guard and bumper before it comes to the hinged connection and will be moving downwardly at that time and be able freely to pass over said hinge without catching thereon or damaging the hinge. If desired, the hinged connection 10 can be further recessed to eliminate any possibility of an object catching thereon.

It will be noted that the recessed portion 14 of the wall 12 is so located that the bumper 3 is carried substantially centrally of the bumper guard 1a and substantially along a diameter of the spherical surface 8a of the rear portion 7a. Although this is the preferred location of the bumper 3 with respect to the bumper guard 1a, it will be understood that a modification of the structure of the guard 1a will permit the bumper 3 to be located forwardly, rearwardly, upwardly or downwardly from the position illustrated in Figure 5. Although the wall 12 may cover the entire front end of the rear portion 7a, that is not required since it is only necessary that sufficient bearing surface be provided for the bumper 3 by the recessed portion 14 against which the bumper 3 may be pressed by the projection 9a carried by the front portion 5a.

When it is desired to connect the bumper guard 1a of Figure 5 to a bumper 3 the front portion 5a is swung away from the rear portion 7a by the hinged connection 10 and the rear portion 7a is positioned about the bumper 3 by seating said bumper within the recessed portion 14 of the wall 12. The front portion 5a is then swung down by the hinged connection 10 until the projection 9a bears against the front surface of the bumper 3 and presses the rear surface of said bumper against the surface 29a of the recessed portion 14 of wall 12. Bolts 17a and 17b are then threaded into the apertures 21a and 21b of wall 12 until the heads 23a and 23b of said bolts bear against the shoulders 25a and 25b in the front portion 5a. At that time the bumper guard 1a is securely fastened to the bumper at the desired location. The heads 23a and 23b of bolts 17a and 17b, respectively, do not project beyond the front surface 15a of the front portion 5a and consequently afford no obstruction along said surface and are not adapted to be broken off or otherwise damaged.

While I have stated that the preferred surface of the bumper guard of my invention is spherical, except for the front inwardly directed surface, it will be appreciated that curved surfaces other than those of a sphere may also be employed and a reference to a spherical surface in the claims should be so construed. Furthermore, the inwardly curved surface of the front portion of the bumper guard of my invention might, for example, be replaced by a pair of plane surfaces which are directed inwardly toward each other and, at their intersection, form a line generally parallel to the longitudinal axis of the bumper to which the bumper guard is attached. These modifications and others which will be suggested by my disclosure are embraced by this invention as will be apparent from the appended claims.

I claim:

1. A guard element for a bumper, said element comprising a front portion and a rear portion, at least one opening defined by said portions through which the bumper is adapted to extend, and means for securing the two portions together with the bumper being gripped between the two portions, said rear portion having a spherical surface and said front portion including an inwardly curved surface.

2. The guard element of claim 1 wherein the surface of the rear portion is more than hemispherical.

3. The guard element of claim 1 wherein the rear portion is substantially hollow.

4. The guard element of claim 1, wherein one of the two portions is recessed to receive the bumper and the other portion carries a projection adapted to bear against the bumper and hold it in said recess.

5. The guard element of claim 1 wherein the two portions have cooperating projections and recesses between them to prevent shifting of the portions relative to each other either longitudinally of the bumper or vertically with respect to the bumper.

6. The guard element of claim 1 wherein the bumper is gripped between the two portions substantially along a diameter of the portion having the spherical surface.

7. The guard element of claim 1 wherein the front portion includes a surface which is a continuation of the spherical surface of the rear portion.

8. A guard element for a bumper, said element comprising a front portion having an inwardly curved surface and a rear portion having a spherical surface, at least one opening defined by said portions through which the bumper is adapted to extend, means adapted to secure said portions together on opposite sides of the bumper, and cooperating interengaging elements of each portion being adapted to prevent relative movement between said two portions when they are secured about the bumper.

9. The combination of claim 8 wherein the spherical surface extends forwardly of the front surface of the bumper.

10. A guard element for a bumper, said element comprising a front portion having an inwardly curved surface and a rear portion having a spherical surface and means adapted to secure said portions together, said front portion also including a continuation of the spherical surface of the rear portion, the free edge of said rear portion, at its junction with the front portion, overlying in part the adjacent edge of said front portion.

11. A substantially rigid guard element adapted to be connected with a bumper member, said element having a generally spherical surface except for its front face which has an inwardly curved surface, an opening through said element rearwardly of, and at the same horizontal level as, the most inwardly curved part of said inwardly curved surface through which opening the bumper member is adapted to pass, said inwardly curved surface being adapted to cam a bumper of another automobile into alignment on the same horizontal level as its bumper member.

12. A guard element for a bumper, said guard element comprising a front portion and a rear portion adapted to be disposed on opposite sides of a bumper and to extend above and below the bumper, said front and rear portions each having a pair of spaced bumper engaging surfaces, said rear portion providing cam surfaces leading in all directions from behind the bumper to a position forwardly thereof, and an inwardly curved surface on the front portion of said guard, with the axis of curvature of said curved surface being generally horizontal.

13. The guard element of claim 1 wherein there is a line of cleavage between the front and rear portions of the guard with said line of cleavage being forward of the front surface of the bumper.

14. A guard element for a bumper, said element comprising a first portion and a second portion, and means for securing the two portions together upon the bumper with a line of cleavage between the portions, said cleavage line lying in a plane substantially at right angles to the front surface of the bumper.

PAUL M. MITCHELL.

References Cited in the file of this patent

UNITED STATES PATENTS

| Number | Name | Date |
|---|---|---|
| 1,457,532 | Lyon | June 5, 1923 |
| 1,516,961 | French et al. | Nov. 25, 1924 |
| 1,610,488 | Buck | Dec. 14, 1926 |
| 2,062,313 | Jandus | Dec. 1, 1936 |
| 2,086,396 | Taff | July 6, 1937 |
| 2,134,422 | Thunder | Oct. 25, 1938 |
| 2,184,631 | Buchanan | Dec. 26, 1939 |
| 2,205,592 | De Hoffmann | June 25, 1940 |
| 2,229,491 | Brooke | Jan. 21, 1941 |
| 2,259,440 | Fageol | Oct. 21, 1941 |
| 2,273,131 | Monckmeier | Feb. 17, 1942 |
| 2,397,064 | Verner | Mar. 19, 1946 |